INVENTOR.
Lewis E. Herr

United States Patent Office 3,241,629
Patented Mar. 22, 1966

3,241,629
DEFLECTION STEER CONTROL MECHANISM FOR
SWING AXLE SUSPENSION
Lewis E. Herr, Pontiac, Mich., assignor to General Motors Corporation, Detroit, Mich., a corporation of Delaware
Filed Mar. 18, 1964, Ser. No. 352,791
7 Claims. (Cl. 180—73)

This invention relates to swing axle suspension and more particularly to swing axle suspensions of the type in which each driving wheel is rigidly connected at the outboard end of a live half axle, the inboard end of which is operatively connected by a universal joint to a resiliently mounted differential assembly.

An object of the invention is to provide an improved swing axle suspension.

Another object is to provide a swing axle suspension of the general type described incorporating means for controlling the deflection steer characteristics thereof.

A further object is to provide a suspension structure of the stated character including means for preventing transmission of vertical spring reaction to the resiliently mounted differential assembly.

Figure 1:
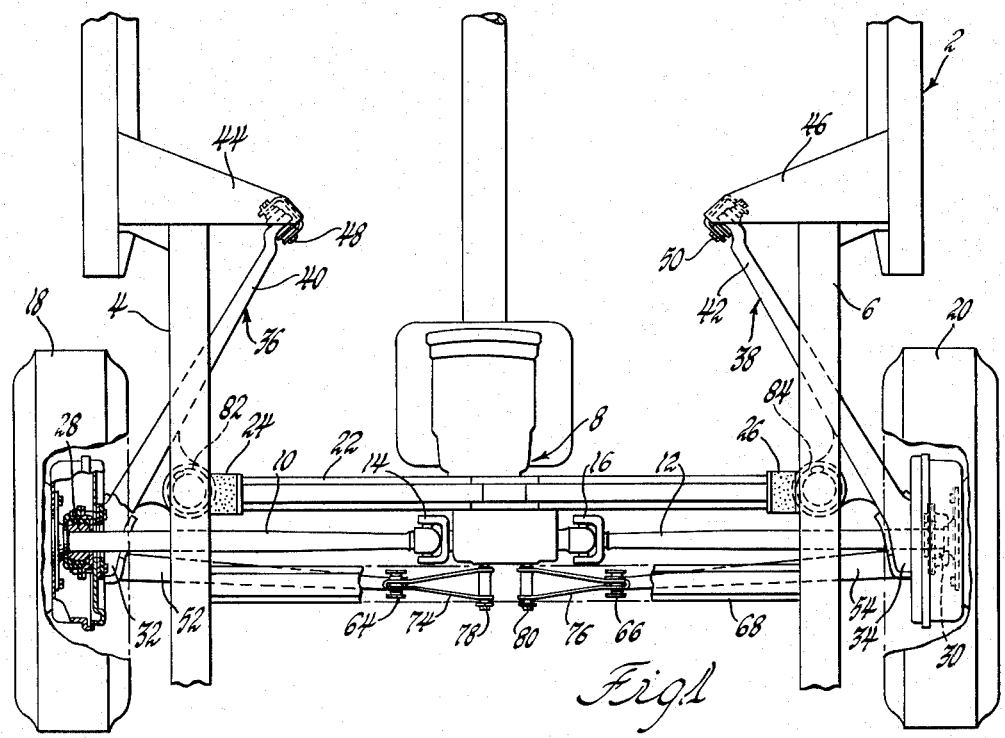
Figure 2:
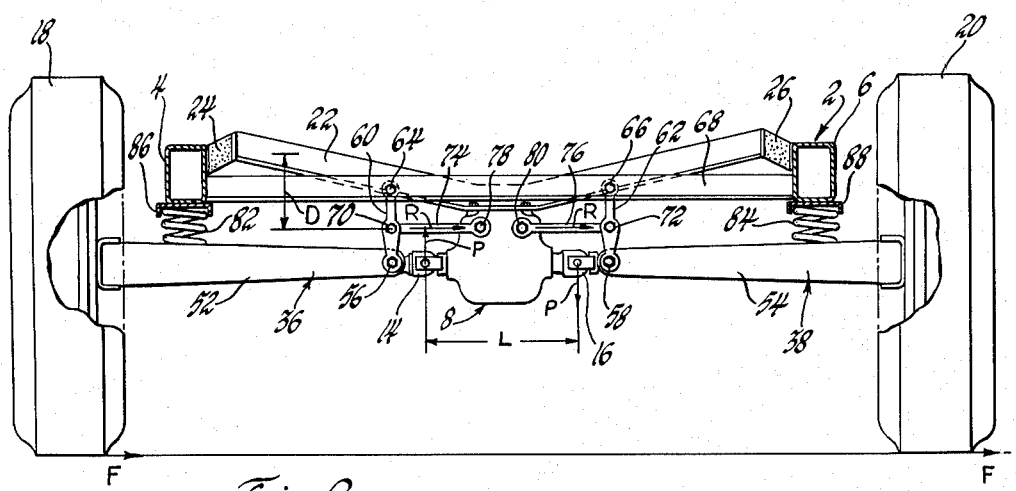

These and other objects, advantages and features of the invention will become more fully apparent as reference is had to the accompanying drawing wherein:

FIGURE 1 is a partial plan view, partly in section and with parts broken away, illustrating a suspension construction in accordance with the invention; and FIGURE 2 is a rear end elevational view of the structure shown in FIGURE 1.

In a swing axle suspension, the deflection steering characteristics may result in adverse handling of the vehicle. One cause of such characteristics in a conventional swing axle construction results from side loads which develop in cornering. The present invention is directed to a construction in which the forces resulting from tire side loads may be effectively cancelled and thereby maintain optimum wheel camber condition throughout the normal range of vertical deflection of the wheels.

In FIGURES 1 and 2 of the drawings, there is shown the rear portion of a vehicle chassis in which the reference numeral 2 designates the usual frame or superstructure including a pair of parallel longitudinally extending side rails 4 and 6. Extending transversely beneath side rails 4 and 6 is a transaxle assembly comprising a combined transmission and differential mechanism 8 having oppositely extending live axles 10 and 12, the inboard ends of which are operatively connected thereby by universal joints 14 and 16. At their outboard ends, axles 10 and 12 are rigidly secured to traction wheels 18 and 20 so that each of the wheels remains perpendicular to the axis of rotation of the associated live half axle during vertical deflection of the wheels relative to the superstructure.

According to one feature of the invention, the transmission and differential assembly 8 is rigidly secured to a transverse beam 22 which substantially bridges the space between frame side rails 4 and 6 and is secured to each of the latter by elastic mounts 24 and 26.

According to another feature of the invention, each of the wheels 18 and 20 and the adjacent outer portion of the associated live axle is journalled in spherical bearing assemblies 28 and 30 which are mounted in the hub portion 32 and 34 of generally V-shaped wheel control arms 36 and 38. The spherical bearing assemblies 28 and 30 accommodate dissimilarity in the path of swinging movement of each live axle and the associated wheel control arm arising from the fact that the axis of swing of each is not coincident. As seen best in FIGURE 1, the forward branches 40 and 42 of arms 36 and 38 are connected to inboard brackets 44 and 46 on the vehicle frame by elastically buffered pin joints 48 and 50. The rearward branches 52 and 54 of arms 36 and 38 in turn extend generally laterally inwardly slightly behind half axles 10 and 12 for pivotal mounting, in a manner shortly to be described, on axes somewhat outboard of the geometric center of the adjacent universal joints 14 and 16.

According to the principal feature of the invention, the inner ends of branches 52 and 54 are connected by pin joints 56 and 58 to the lower ends of laterally spaced vertically extending links 60 and 62, the upper ends of which are pivotally mounted by pin joints 64 and 66 to a frame cross member 68. Cross member 68 is located rearwardly of half axles 10 and 12 and is rigidly connected to side rails 4 and 6. Vertically intermediately thereof, links 60 and 62 are pivotally connected by pin joints 70 and 72 to the outer ends of transversely extending links 74 and 76, the inner ends of which are pivotally connected by pin joints 78 and 80 to transmission-differential mechanism 8.

To elastically support the vehicle superstructure 2 relative to wheels 18 and 20, conventional coil springs 82 and 84 are disposed in compression between upper spring seats 86 and 88 on frame 2 and lower spring seats formed on control arms 36 and 38.

In operation, the suspension construction described above functions as follows. When the vehicle is cornering (negotiating a turn), a side load F is developed at each wheel which produces opposite vertical loads P on the respective universal joints 14 and 16. With the transmission-differential 8 flexibly mounted relative to the superstructure, the oppositely directed vertical loads P on universal joints 14 and 16 normally induce rotation of the transmission-differential 8 and universal joints about a longitudinal horizontal axis, which in turn progressively changes the location of the geometric center of the joints and causes the wheels 18 and 20 to be cambered in a direction inducing an oversteering tendency. However, in the present construction, this tendency is overcome due to the fact that the branches 52 and 54 of control arms 36 and 38 are effectively pivotally connected to the transmission-differential. Thus, in addition to the loads P exerted on the universal joints, the transmission-differential also experiences side loads R from each wheel transmitted by branches 52 and 54 through links 60–74 and 62–76, respectively. In practice, if the transaxle support beam 22 is mounted in a horizontal plane a distance D above the plane of action of loads R, a couple equal to $2D \times R$ will be produced which can be made opposite and equal to the couple $2P \times L$ where L is the horizontal distance between the geometric centers of the universal joints.

While the above construction enables substantially complete cancellation of the undesirable effect of side loading, direct pivotal connection of the inboard ends of branches 52 and 54 to the transmission-differential 8 would result in part of the vertical spring reaction being absorbed by the transaxle support beam mounts 24 and 26 which in turn would produce vibration of the unit during wheel disturbances. However, in the arrangement shown, the vertical loads just mentioned are absorbed directly by the frame cross member 68 through vertical links 60 and 62, while the side loads induced by cornering are transferred directly to transmission-differential 8 and utilized, as previously described, to cancel universal joint loadings which normally result in oversteering.

It will, of course, be understood that precise dimensioning and location of links 60, 62, 74 and 76 will vary depending upon other vehicle design characteristics and will therefore require calculation in each case in order to satisfy the equal and opposite couples $2D \times R$ and $2P \times L$.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In combination with a vehicle sprung mass, a differential mechanism elastically supported on said sprung mass, a pair of oppositely extending vertically swingable live axles operatively connected at their inner ends to said mechanism, a pair of traction wheels mounted on the outer ends of said axles, a pair of generally V-shaped oppositely extending wheel control arms having hub portions formed in the apices thereof rotatably supporting the outer ends of said axles, means pivotally connecting one of the inner ends of each arm directly to said sprung mass, transversely swingable link means connecting the other of the inner ends of said arms to said sprung mass, and vertically swingable link means connecting said first mentioned link means to said differential mechanism.

2. In combination with a vehicle sprung mass, a differential mechanism elastically supported on said sprung mass, a pair of oppositely extending vertically swingable live axles operatively connected at their inner ends to said mechanism, a pair of traction wheels mounted on the outer ends of said axles, a pair of generally V-shaped oppositely extending wheel control arms having hub portions formed in the apices thereof rotatably supporting the outer ends of said axles, means pivotally connecting one of the inner ends of each arm directly to said sprung mass, vertically extending transversely swingable link means connecting the other of the inner ends of said arms to said sprung mass, and horizontally extending vertically swingable link means connecting said first mentioned link means to said differential mechanism.

3. In combination with a vehicle sprung mass, a differential mechanism elastically supported on said sprung mass, a pair of oppositely extending vertically swingable live axles operatively connected at their inner ends to said mechanism, a pair of traction wheels rigidly mounted on the outer ends of said axles, a pair of generally V-shaped oppositely extending wheel control arms having hub portions formed in the apices thereof, spherical bearing members in said hubs rotatably supporting the outer ends of said axles, means pivotally connecting one of the inner ends of each arm directly to said sprung mass, vertical links pivotally connected at their upper ends to said sprung mass and at their lower ends to the other of the inner ends of said arms, and horizontal links pivotally connected at their outer ends intermediately of said vertical links and at their inner ends to said differential mechanism.

4. In combination with a vehicle sprung mass, a transverse beam elastically supported at opposite ends thereof on said sprung mass, a differential mechanism secured centrally on said beam, a pair of oppositely extending vertically swingable live axles operatively connected at their inner ends to said mechanism, a pair of traction wheels rigidly mounted on the outer ends of said axles, a pair of generally V-shaped oppositely extending wheel control arms having hub portions formed in the apices thereof, spherical bearing members in said hubs rotatably supporting the outer ends of said axles, means pivotally connecting one of the inner ends of each arm directly to said sprung mass, vertical links pivotally connected at their upper ends to said sprung mass and at their lower ends to the other of the inner ends of said arms, and horizontal links pivotally connected at their outer ends intermediately of said vertical links and at their inner ends to said differential mechanism.

5. In combination with a vehicle sprung mass, a transverse beam elastically supported at opposite ends thereof on said sprung mass, a differential mechanism mounted centrally on said beam, a pair of oppositely extending vertically swingable live axles having universal joints at the inner ends thereof operatively connected to said mechanism, a pair of traction wheels rigidly mounted on the outer ends of said axles, a pair of horizontally disposed generally V-shaped oppositely extending wheel control arms having hub portions formed in the apices thereof, spherical bearing assemblies in said hubs rotatably supporting the outer ends of said axles, means pivotally connecting the forward inner end of each arm directly to said sprung mass, a pair of laterally spaced vertical links pivotally connected at their opposite ends to the other of the inner ends of said arms and to said sprung mass respectively, and a pair of transverse links pivotally connected at their opposite ends to said vertical links and said differential mechanism respectively.

6. The structure set forth in claim 5 wherein the imaginary axes defined by the inner ends of said arms lie in a common horizontal plane containing the geometric center of said universal joints.

7. The structure set forth in claim 5 wherein the imaginary axes defined by the inner ends of said arms diverge forwardly.

References Cited by the Examiner
UNITED STATES PATENTS

| | | | |
|---|---|---|---|
| 2,757,747 | 8/1956 | MacPherson | 180—73 |
| 2,968,358 | 1/1961 | De Lorean | 180—73 |
| 2,988,161 | 6/1961 | Herr | 180—73 |

BENJAMIN HERSH, *Primary Examiner.*

A. HARRY LEVY, *Examiner.*